United States Patent

[11] 3,585,538

[72] Inventor Joe P. Lindsey
Bartlesville, Okla.
[21] Appl. No. 812,174
[22] Filed Apr. 1, 1969
[45] Patented June 15, 1971
[73] Assignee Phillips Petroleum Company

[54] NOTCH REJECTION FILTER
2 Claims, 1 Drawing Fig.

[52] U.S. Cl. 333/74, 333/70, 333/75
[51] Int. Cl. H03h 9/00
[50] Field of Search 333/30, 75, 76, 29

[56] References Cited
UNITED STATES PATENTS

| | | | |
|---|---|---|---|
| 2,676,308 | 4/1954 | Vos | 333/29 |
| 2,093,665 | 9/1937 | Tellegen | 333/75 |
| 3,074,026 | 1/1963 | Kuzminsky | 330/144 |
| 2,392,476 | 1/1946 | Hodgson | 333/75 |
| 1,897,639 | 2/1933 | Kreer | 333/75 |
| 3,325,753 | 6/1967 | Shearer | 333/75 |

*Primary Examiner*—Herman Karl Saalbach
*Assistant Examiner*—C. Baraff
*Attorney*—Young and Quigg

ABSTRACT: A filter which completely suppresses one frequency has one center tapped inductance connected in parallel with a condenser, and a resistor having one terminal connected to the center tap of said inductance. The input signal to be filtered is applied between the condenser and the other terminal of the resistor while the output impedance is connected between the other terminal of the condenser and the other terminal of the resistor.

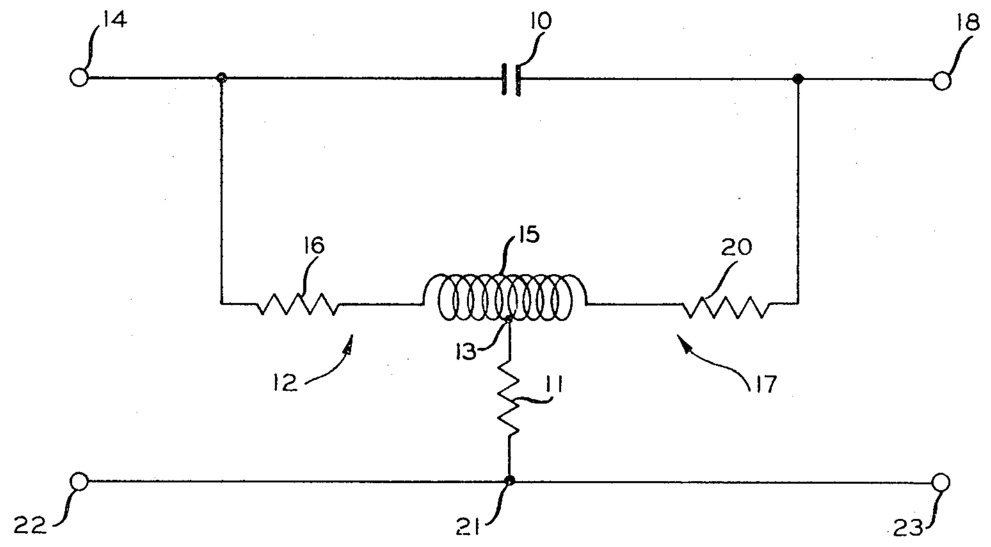
INVENTOR.
J. P. LINDSEY
BY Young & Quigg
ATTORNEYS

NOTCH REJECTION FILTER

BACKGROUND OF THE INVENTION

Notch rejection filters are useful in entirely suppressing one frequency from a complex Heretofore, input while permitting the other frequencies to pass with minimal attenuation. One useful application is in filtering 60 cycle voltages from signal lines, particularly for seismic amplifiers. Such amplifiers are fed by minute voltages from sensitive seismometers which measure vibrations of the earth. The degree of amplification is so high that minute quantities of 60 cycle hum can introduce significant errors in the recording and subsequent interpretation of the amplified seismic data. Notch rejection filters are useful in various other applications where the elimination of a particular frequency from a complex voltage is desired.

Heretofore, two types of notch filters, known as the twin-T and bridge-T types, have been available. Both utilize two condensers connected in series, and these condensers must have very accurate capacitance has hindered the use of such filters because it is difficult to obtain very accurate capacitance values, even by trimming a capacitor of approximately the desired value.

I have provided a notch filter with a novel arrangement of circuit components utilizing only one condenser. Moreover, slight adjustments in the notch frequency can be made by changing the value of a single resistor.

BRIEF DESCRIPTION OF THE INVENTION

My novel notch rejection filter includes a condenser and a resistor. A circuit comprising an inductor having a connection at or near its center is connected across the condenser with one terminal of the resistor connected to the inductance center tap. This circuit has an additional resistance component which can be the internal resistance of the inductance. Alternatively, a resistor can be connected in series with the inductance, in which case the resistance component is the sum of the value of the resistor and the internal resistance of the inductance. This total resistance is equally divided by the inductance center tap.

The mutual coupling between the two halves of the inductance contributes toward producing the advantages of the filter as hereinafter pointed out.

The complex input voltage to be filtered is applied between one terminal of the condenser and the other terminal of the resistor, i.e., the terminal not connected to the inductance center tap. The output impedance is connected between the other terminal of the condenser and the other terminal of the resistor.

As a result, one frequency is entirely suppressed in the voltage appearing across the output impedance.

DETAILED DESCRIPTION OF THE INVENTION

The invention will be more fully understood from consideration of the following detailed description taken in conjunction with the accompanying drawing, in which:

The FIGURE is a schematic circuit diagram of a filter constructed in accordance with the invention.

Referring now to the drawing in detail, the filter comprises a condenser 10 and a resistor 11. A circuit 12 is connected between the center tap of an inductance 15 between terminal 13 of the resistor 11 and one terminal 14 of the condenser 10. The terminal 14 also constitutes one input terminal of the filter.

The circuit 12 includes approximately half the inductor 15 and a resistance component indicated by the unit 16. It will be understood that this resistance component can be solely the internal resistance of one-half the inductor 15. Alternatively, a separate fixed resistor 16 can be connected in series with the inductor 15, in which case the resistance component represents the sum of the value of the fixed resistor and the internal resistance of half the inductor 15.

A second circuit 17 is connected between the terminal 13 and the other terminal 18 of the condenser 10. The terminal 18 constitutes one of the output terminals and is connected to the output impedance of the circuit. Like the circuit 12, the circuit 17 includes the other half of inductor 15 and a resistance component represented by the unit 20.

The other terminal 21 of the resistor 11 is connected to an input terminal 22 and an output terminal 23.

In operation, the input signal to be filtered is applied to the terminals 14, 22. The action of the filter is to entirely suppress one frequency in the filter output which is applied to an impedance connected to the terminals 18 and 23.

The notch frequency is given by the following equation:

$$4\pi^2 f^2 = \frac{r+R}{2LC(r-2R)}$$

wherein $f$ is the frequency to be suppressed expressed in cycles per second; $r$ is the resistance component 16, 20 of the respective circuits 12, 17 in ohms; $R$ is the value of the resistor 11 in ohms; $L$ is the inductance of one-half of the unit 15 in henries and $C$ is the value of the capacitance 10 in farads.

The following relationship also holds between the components of the filter:

$$L/C = r(r+2R)$$

where the units have the values previously defined.

It will be noted that the above equations are independent of the output impedance, and that the rejection frequency $f$ can be varied simply by adjustment of the value $R$ of the resistor 11.

It will further be apparent that the sharpness of the notch is determined by the resistance component $r$ representing the values of the units 16 and 20.

The foregoing equations are determined from the transfer function of the filter which relates the input and output voltages to the values and arrangements of the circuit components. It is derived by application of standard Laplace transform theory.

In one filter which was utilized successfully for removing 60 cycle hum from the input to a seismic amplifier, the inductance $L$ had a value of 125 millihenries, the resistance $r$ was 14 ohms, the resistance $R$ was 306 ohms and the capacitance $C$ was 14.27 microfarads.

Other variations and modifications of this invention will be apparent to those skilled in the art without departing from the spirit and scope of the invention.

I claim:

1. A notch rejection filter comprising an approximately center tapped inductor, a first fixed resistor, a condenser and second fixed resistor all connected in series, a third fixed resistor having one terminal connected to the tap of said inductor, means for connecting an alternating voltage to be filtered between the other terminal of said third resistor and one terminal of said condenser, and means for connecting an output impedance between the other terminal of said third resistor and the other terminal of said condenser, whereby the effective resistance of the input circuit is equal to the sum of the value of the first resistor and one-half of said inductor and the effective resistance of the output circuit is equal to the sum of the value of said second fixed resistor and the internal resistance of one-half of said inductor.

2. The filter of claim 1 in which $$L/C = r(r+2R) \text{ and}$$

$$4\pi^2 f^2 = \frac{r+R}{2LC(r+2R)}$$

wherein $f$ is the notch rejection frequency, $r$ is the value of each resistance component in ohms, $R$ is the value of said resistor, $L$ is the value of one-half the inductor in henries and $C$ is the value of said condenser in farads.